(12) United States Patent
Thompson et al.

(10) Patent No.: US 6,471,738 B1
(45) Date of Patent: Oct. 29, 2002

(54) CEILING-MOUNTED AIR FILTRATION DEVICE

(75) Inventors: Arne Thompson; Patricia Verbryke, both of North Bend, WA (US)

(73) Assignee: Health & Home Technologies, North Bend, WA (US)

( * ) Notice: Subject to any disclaimer, the term of this patent is extended or adjusted under 35 U.S.C. 154(b) by 0 days.

(21) Appl. No.: 09/532,992

(22) Filed: Mar. 22, 2000

(51) Int. Cl.[7] .............................................. B01D 45/00
(52) U.S. Cl. .......................... 55/471; 55/414; 454/294
(58) Field of Search ........................... 55/385.1, 385.2, 55/471, 473, 413, 414, 490; 454/230, 293, 294; 96/15

(56) References Cited

U.S. PATENT DOCUMENTS

| | | | |
|---|---|---|---|
| 2,114,761 A | * | 4/1938 | Crider |
| 4,265,643 A | * | 5/1981 | Dawson |
| 4,450,756 A | * | 5/1984 | Kling ........................ 55/467 |
| 4,711,161 A | * | 12/1987 | Swin, Sr. et al. |
| 4,849,862 A | | 7/1989 | Diskin et al. |
| 6,004,365 A | | 12/1999 | Fiacco |
| 6,019,808 A | * | 2/2000 | Ishikawa et al. .............. 55/320 |
| 6,036,737 A | * | 3/2000 | Smith et al. ............... 55/385.2 |
| 6,168,517 B1 | * | 1/2001 | Cook ......................... 454/269 |

FOREIGN PATENT DOCUMENTS

| | | | | |
|---|---|---|---|---|
| JP | 11162249 A | * | 6/1999 | |
| JP | 11306853 A | * | 11/1999 | |
| JP | 2000079309 A | * | 3/2000 | |

* cited by examiner

*Primary Examiner*—David A. Simmons
*Assistant Examiner*—Frank M. Lawrence
(74) *Attorney, Agent, or Firm*—Barry L. Davison; Davis Wright Tremaine (57) ABSTRACT

The present invention provides an air filtration device attachable to a motor. The device comprises a housing comprising an upper part and a lower part, wherein the upper and lower parts are parallel and spaced apart from each other and define a cavity therebetween, and wherein the lower part has a centrally positioned opening therein; an impeller positioned coaxially with the axis of the housing between the upper and lower parts thereof and attached to the motor; and a filter positioned between the upper and lower parts and positioned around a perimeter of the housing.

39 Claims, 7 Drawing Sheets

CEILING-MOUNTED AIR FILTRATION DEVICE

FIELD OF THE INVENTION

The present invention pertains to air filtration devices, and more particularly to efficient and quiet air filtration devices designed to be mounted on a ceiling.

BACKGROUND

Indoor pollutants, including airborne pollutants such as dust, pollen, and cigarette smoke are potentially as harmful to health. Enclosed areas also concentrate other indoor pollutants such as formaldehyde and bacteria, especially in new buildings without operable windows. Thus, there is a demand for methods of and mechanical devices for removing indoor air pollutants. Devices used to remove airborne pollutants fall into two categories: devices integrated into a building's air handling system, and devices that are free standing. Each of these has several disadvantages: air filtration systems that are integrated with a building air handling system are efficient, but are very expensive and, if not incorporated at construction time, retrofit is costly in labor and materials if it is even possible. Free-standing devices are cheaper and can be added in a room after construction, but are bulky, take up a lot of room, and cannot be conveniently centrally located. Moreover, they are not designed to be simply hung in a space and switched on.

Some attempts have been made to design a device which incorporates the convenience and lower cost of free-standing devices with the unobtrusiveness of an integrated system. One such attempt is shown in U.S. Pat. No. 4,849,862 to Diskin et al. Diskin discloses a ceiling-mounted air purification unit. This purification unit has several disadvantages. First, the Diskin device is still quite bulky and takes up a significant amount of space. Second, its construction makes it expensive and difficult to build, because of the type, amount and configuration of the filtration apparatus contained in the device. Third, the design of the device makes it difficult to service. Fourth, the design of its air-moving components make it inefficient and noisy. Finally, the device is not aesthetically pleasant because of its bulk and design.

Given the above problems and the disadvantages in existing devices that have been designed to address the problems, there is a need in the art for an air filtration device that is small, efficient, quiet and aesthetically pleasing.

SUMMARY OF THE INVENTION

The present invention provides an air filtration device attachable to a motor. The device comprises a housing comprising an upper part and a lower part, wherein the upper and lower parts are parallel and spaced apart from each other and define a cavity therebetween, and wherein the lower part has a centrally positioned opening therein; an impeller positioned coaxially with the axis of the housing between the upper and lower parts thereof and attached to the motor; and a filter positioned between the upper and lower parts and positioned around a perimeter of the housing.

DETAILED DESCRIPTION OF THE INVENTION

Described below are two embodiments of the present invention which illustrate two ways the invention can be implemented. In the descriptions that follow, like numerals represent like elements in all figures. For example, where the numeral 10 is used to refer to a particular element in one figure, the numeral 10 appearing in any other figure refers to that same element.

First Embodiment

Figure 1A:
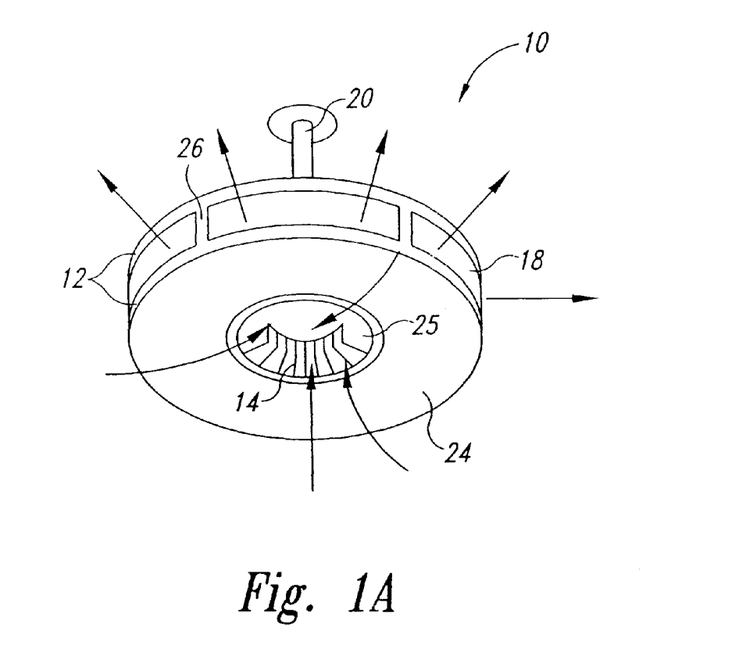
FIG. 1A is an isometric view of the bottom of a first embodiment of the present inventive air filtration device.
Figure 1B:
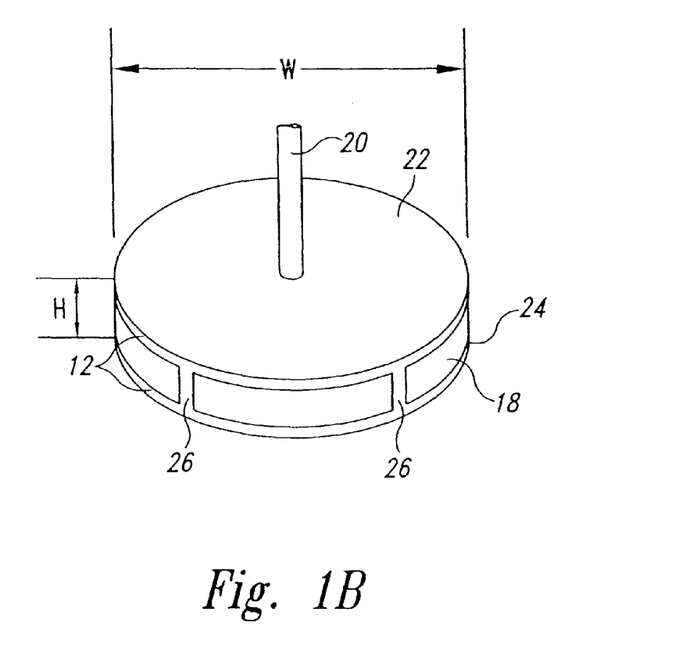
FIG. 1B is an isometric view of the top of the first embodiment of the present inventive air filtration device.

FIGS. 1A and 1B together illustrate a first embodiment of the inventive air filtration device 10. FIG. 1A illustrates the lower part 24 of the device 10. The device 10 comprises a housing 12, an impeller 14 inside the housing, a motor 40 (see FIG. 2) also inside the housing, and a filter 18 positioned around a perimeter of the housing 12. FIG. 1B shows the upper part 22 of the device 10, and a rod 20 that connects the device 10 to a ceiling. As shown by the arrows, the device 10 draws air in through the opening 25 in the lower part 24, and exhausts the air through the filter 18. In this way, the device 10 filters the air in a room. The device 10 has an overall width W which can vary between 6 inches and about 36 inches, and an overall height H which varies between about 2 inches and about 12 inches. The device 10 has several advantages. Among other things, its compact design and low profile make it small and unobtrusive; its impeller design makes it efficient and quiet; its filter arrangement makes it easy and cheap to maintain the unit; its design makes it easy to retrofit into existing rooms; its design makes it easy to add accessories such as light fixtures; its design and construction make it easy to build and affordable; and, finally, it is aesthetically pleasing.

Figure 2:
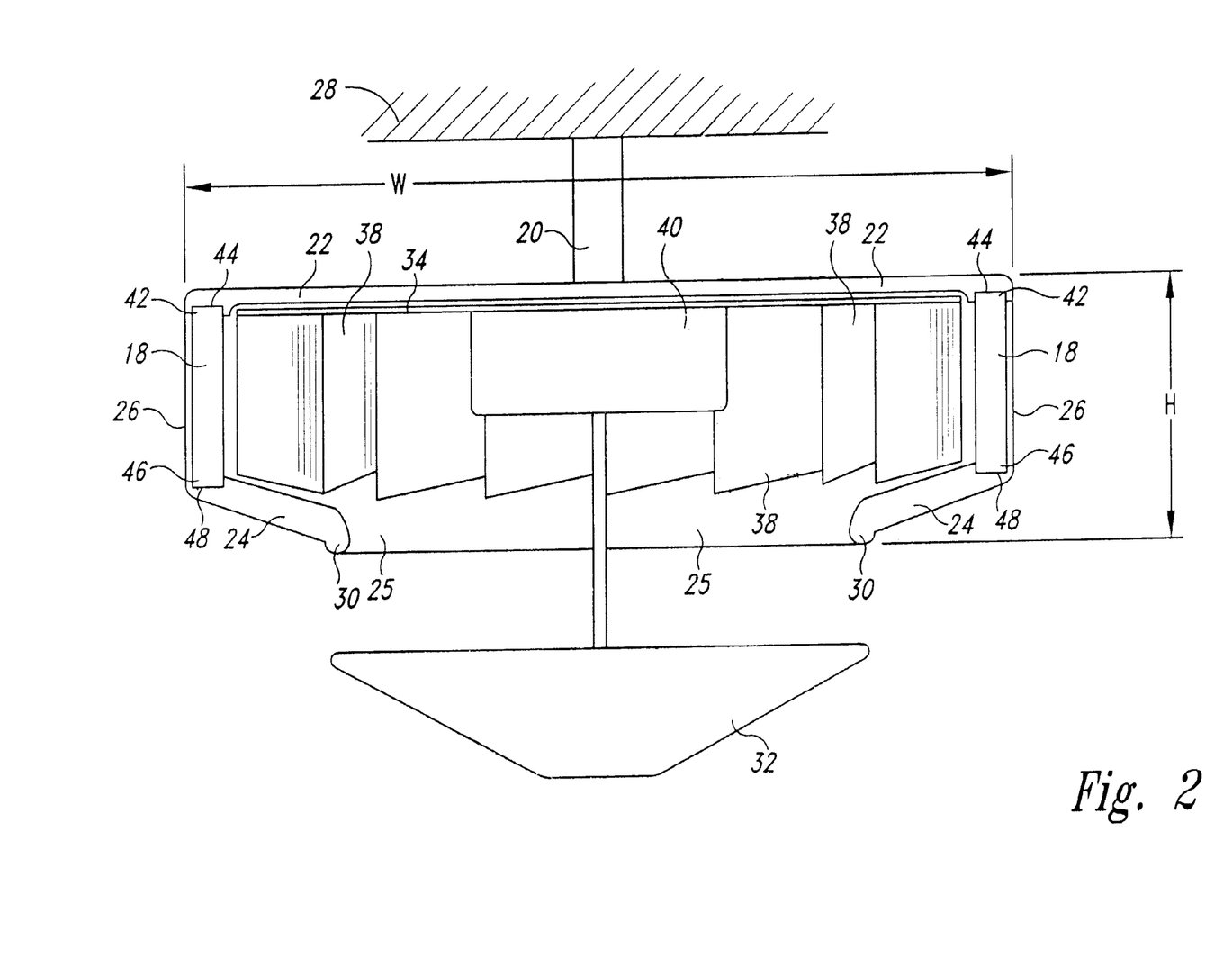
FIG. 2 is a cross-sectional elevation of the first embodiment shown in FIGS. 1A and 1B, including an optional decorative accessory.

FIG. 2 illustrates the details of the device 10. The housing 12 may be of any shape, but is preferably axisyrmmetric and comprises an upper part 22 and a lower part 24 connected to each other, and held spaced apart from each other, by a plurality of structural members 26 (see FIGS. 1A and 1B) positioned at equal intervals around the perimeter of the housing 12. The upper part 22 and lower part 24 define a cavity therebetween. The upper part 22 is round and receives a rod 20 which connects the entire device 10 to a ceiling 28. Although the rod 20 is the preferred way of attaching the device to the ceiling, it is not indispensable; if a very low device profile is necessary or desirable, the upper part 22 can be attached directly to the ceiling. The device 10 also need not be attached to the ceiling; it can be attached to any surface in a room. The lower part 24 generally has the same shape as the upper part 22, but it has an opening 25 in the center which functions as an air inlet. A bell-mouth portion 30 surrounds the opening 25 to enhance the intake of air into the device.

All the parts of the housing 12 can be made of any material, but are preferably made of a molded plastic or stamped metal, which gives the device suitable strength at a low weight. For decorative purposes, the housing may be painted various colors or covered with a resin or enamel which can be textured to make it resemble wood or other natural materials. A lighting fixture 32 or other decorative accessory can be attached to the device 10, so that the device 10 can serve double duty as a filtration unit and a light fixture. The fixture 32 is preferably positioned and attached to a central location on the device 10.

As further discussed below, the impeller 14 is positioned in the cavity between the upper part 22 and lower part 24 and is a centrifugal impeller comprising a disc 34, a hub 36 and plurality of blades 38 (see FIGS. 3A–3C). As the impeller 14 rotates, the plurality of blades 38 draw air in through the opening 25 in the lower part 24 and drive the air out through the filter 18 at the perimeter of the housing 12. The blades are designed to produce adequate flow rates at low angular speeds while minimizing aerodynamic noise created by the device. The impeller may have a diameter between about 10 percent and about 95 percent of the overall width W of the device 10.

The motor 40 is used to rotate the impeller 14. The motor 40 is placed inside the cavity of the housing 12 and within the hub 36 of the impeller to save space and give the device 10 as low a height H as possible. The motor 40 can be any of several types of motors that create rotational motion, but it is preferably a commercially available electric motor used to power ceiling fans. For the range of angular velocity and air volume throughput of the device 10, the motor 40 should have a power output between about 50 watts and about 200 watts.

The filter 18 is positioned around the perimeter of the housing 12 and fits between the upper part 22 and lower part 24. An upper edge 42 of the filter 18 fits into a groove 44 in the upper part 22 of the housing, while a lower edge 46 of the filter fits into a groove 48 in the lower part 24 of the housing. Inserting the edges 42 and 46 into the grooves 44 and 48 creates a seal which ensures that all the air flowing through the device flows out through the filter, instead of flowing around the edges of the filter. The filter 18 may be any kind of mechanical filtration device, such as charcoal or high efficiency particulate air (HEPA) filter, or any kind of electrical filtration device, such as an electrical or electrostatic attraction filter. Regardless of its type, the filter 18 is designed to be easily replaced or cleaned as necessary. The filter 18 is designed to filter air flowing through the filter at rates between about 150 cubic feet per minute and about 600 cubic feet per minute. At these flow rates, a mechanical filter such as a HEPA filter should last 1–3 years before needing replacement or cleaning, while an electrical filter such as an electrical attraction filter should need cleaning or replacement about once per year.

A preferred way of implementing the filter 18 is using a strip of HEPA filtration material. The strip is attached to the housing 12 by positioning it around the perimeter of the device 10 and fastening its ends together by some means such as VELCRO®, metal hooks, or adhesive strips. To replace the filter 18, the ends of an old filter are disconnected, the old filter is removed from the device, and a new filter is positioned on the device and its ends fastened.

Figure 3A:
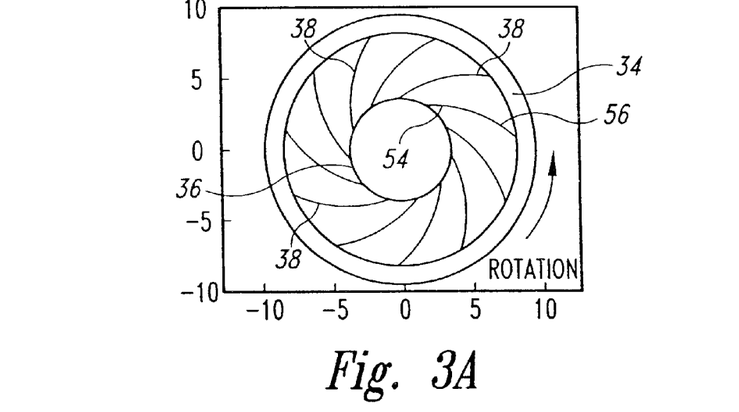
FIG. 3A is a plan view of a first implementation of the impeller.
Figure 3B:
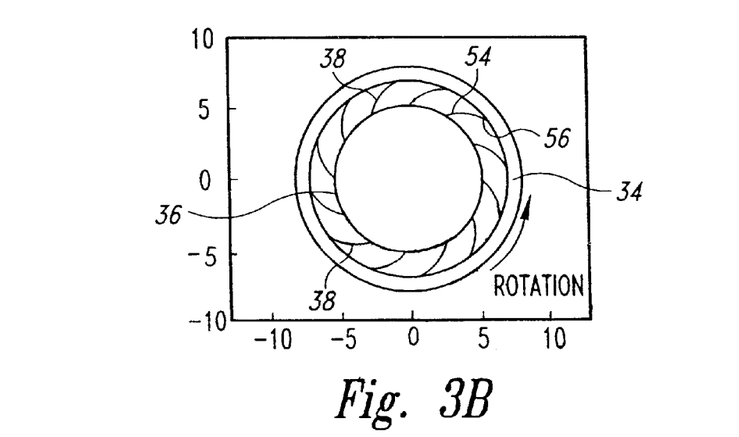
FIG. 3B is a plan view of a second way of implementing the impeller.
Figure 3C:
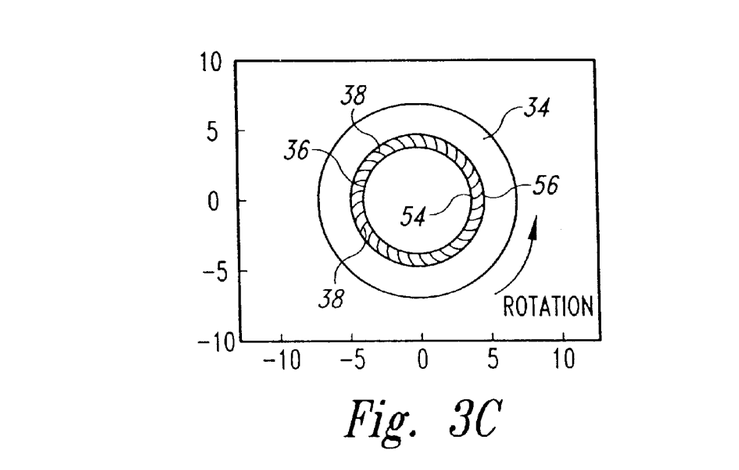
FIG. 3C is a side elevation of a third way of implementing the impeller.

FIGS. 3A, 3B, and 3C illustrate three possible configurations for the impeller 14. All three impeller configurations include a disc 34, a central hub 36 attached to the disc and designed to receive the motor 40 therein, and a plurality of blades 38 attached to the disc. In each impeller, the disc has a diameter between about 10 percent and about 95 percent of the overall width W of the device 10, and the hub 36 has a diameter between about 2 percent and about 95 percent of the diameter of the disc 34. Each blade 38 has an inner end 54 and an outer end 56. FIG. 3A illustrates a first configuration where the blades are backward-curving, meaning that the inner end 54 is the leading edge and the outer end 56 is the trailing edge; in other words, the blades 38 curve around in a direction opposite to the direction of rotation of the impeller. This impeller configuration has substantial advantages over existing fans and filtration devices in creating the best flow rates and lowest noise signatures at low angular speeds. FIG. 3B illustrates a second configuration of the impeller 14. In this second configuration the blades are backward-curving but the diameter of the hub 36 is substantially larger than in the first configuration, so that the blades 38 have a smaller length. FIG. 3C illustrates a third configuration of the impeller in which the blades 38 are forward-curving, meaning that the outer end 56 is the leading edge and the inner edge 54 is the trailing edge; in other words, the blades 38 curve around in a direction the same as the direction of rotation of the impeller. In this third configuration of the impeller 14, the sizes of the hub 36 and blades 38 are chosen so that the blades are farther from the edge of the disc 34 than in the second configuration.

Figure 4:
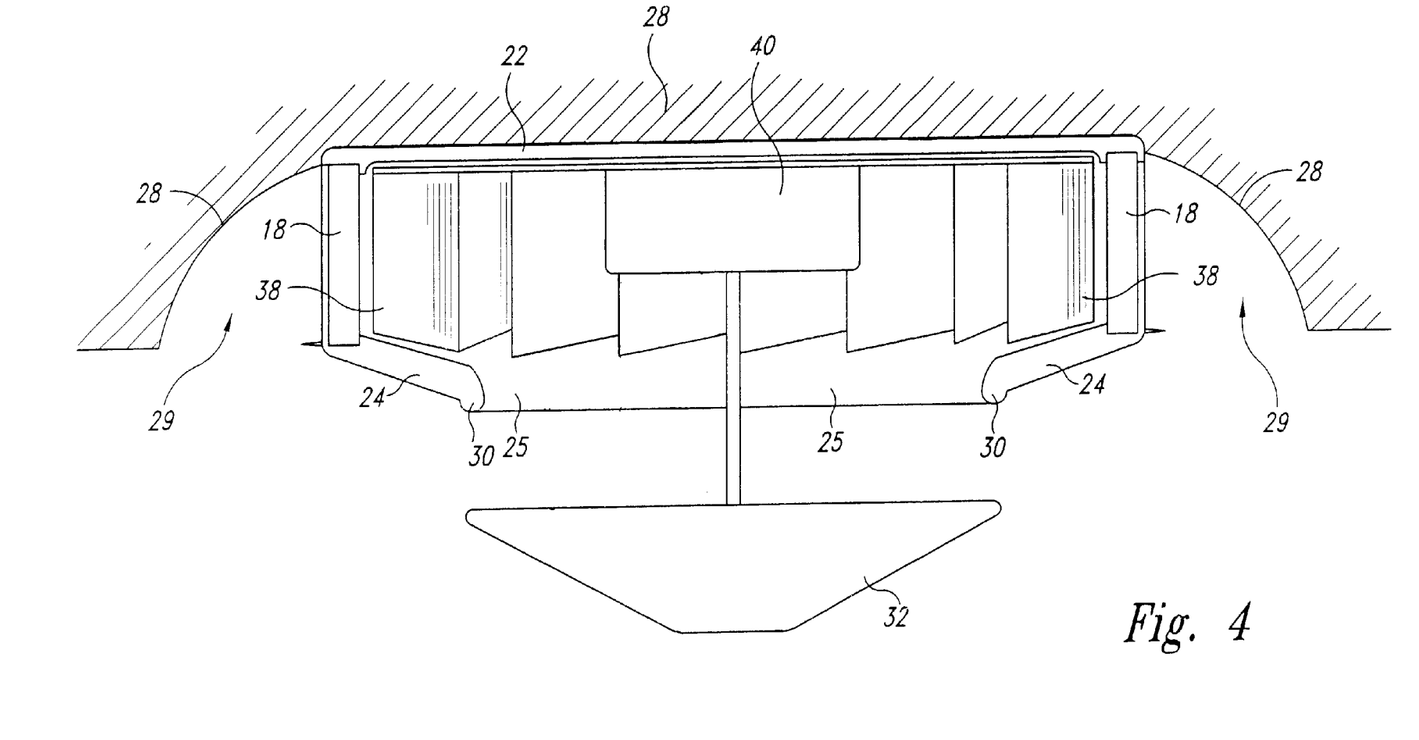
FIG. 4 is a side elevation of an alternate way of attaching the device of FIG. 2 to a ceiling.

FIG. 4 illustrates a way in which the device 10 can be installed. In this installation, the device 10 is positioned in a recess 29 in a ceiling. Positioning the device this way allows it to be less obtrusive in the room in which it is installed, its profile is reduced. In addition, if the edges of the recess 29 are curved as shown, then the air leaving the device 10 through the filter can be downwardly directed.

Figure 5:
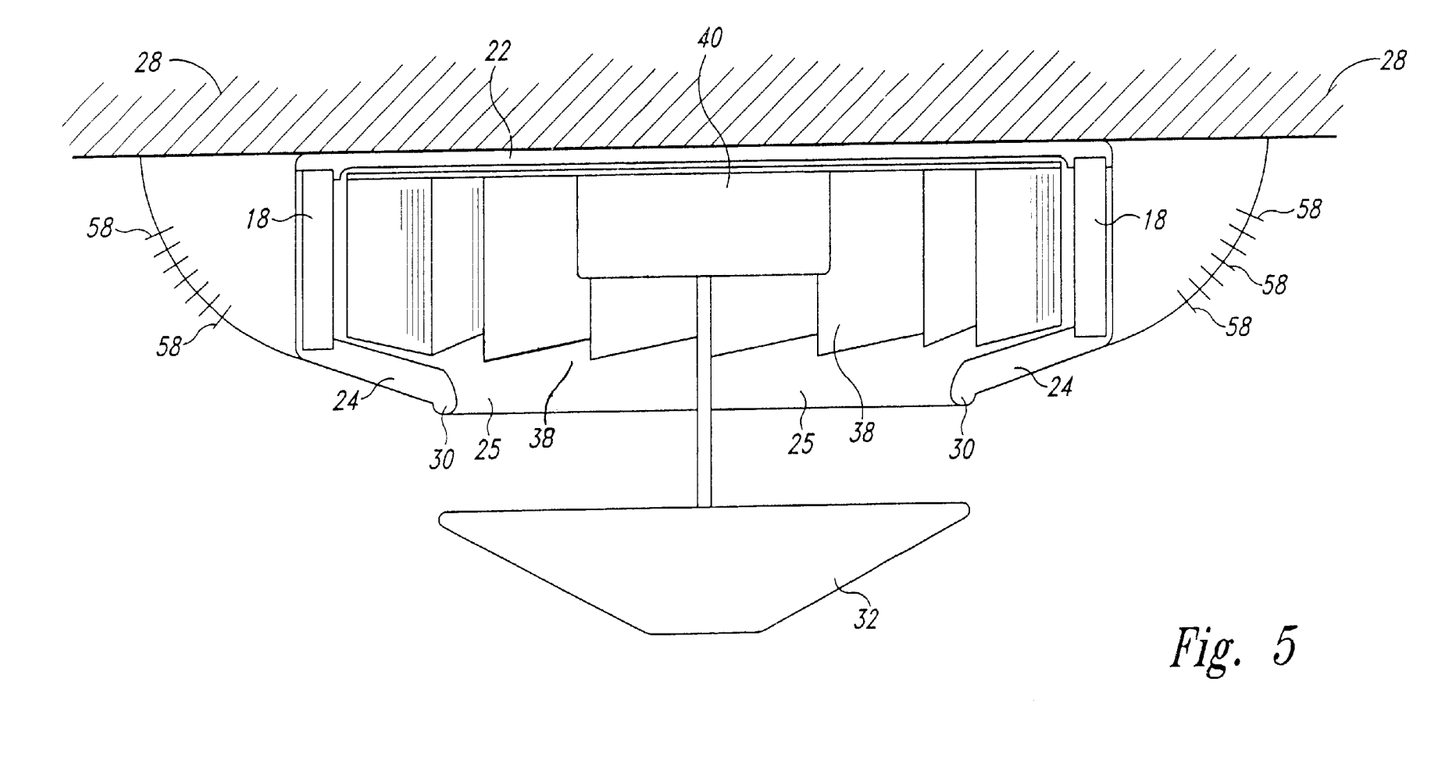
FIG. 5 is a side view of a second alternate way of attaching the device of FIG. 2 to a ceiling, including the addition of aerodynamic vanes which allow the exhaust air to be directed downward.

FIG. 5 illustrates a variation of the device 10 wherein the device is mounted directly to a ceiling 28 and has a plurality of airfoil-shaped vanes 58 around the perimeter thereof. If the device 10 does not have the vanes 58, the air exiting the device through the filter 18 flows out of the device 10 in a direction parallel to the ceiling. If more downwardly-directed flow is desired, the vanes can be installed and adjusted so that they direct the air leaving the filter in a downward direction. The plurality of vanes 58 can be made adjustable, so that air leaving the device can be adjusted to any desired angle.

Second Embodiment

Figure 6A:
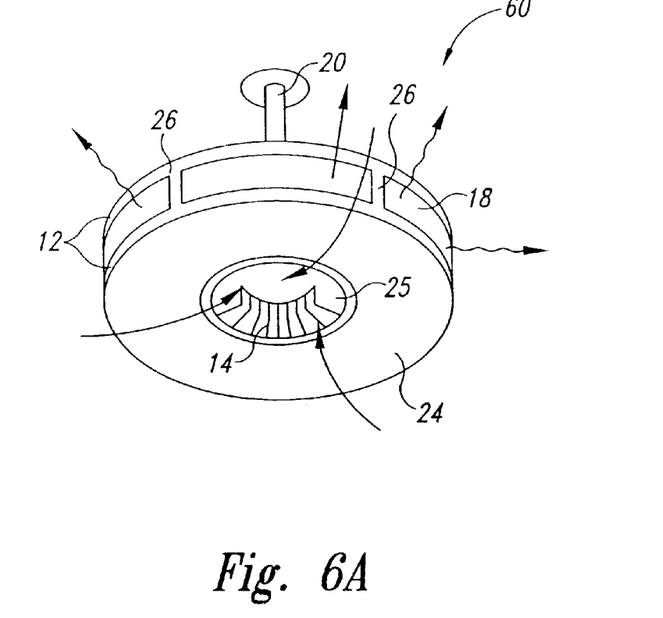
FIG. 6A is a bottom isometric view of a second embodiment of the present inventive air filtration device.
Figure 6B:
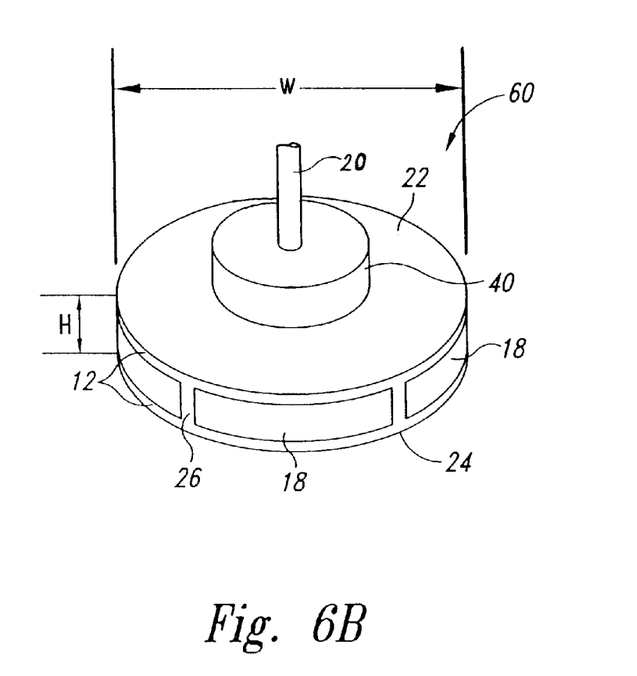
FIG. 6B is an top isometric view of the second embodiment of the present inventive air filtration device.

FIGS. 6A and 6B illustrate a second embodiment of the device 60. The device 60 is nearly identical to the device 10. It has all the same elements as the device 10 and is built and operated in the same way. The primary differences between the device 60 and the device 10 are the position of the motor 40, and the size of the hub 36 of the impeller.

Figure 7:
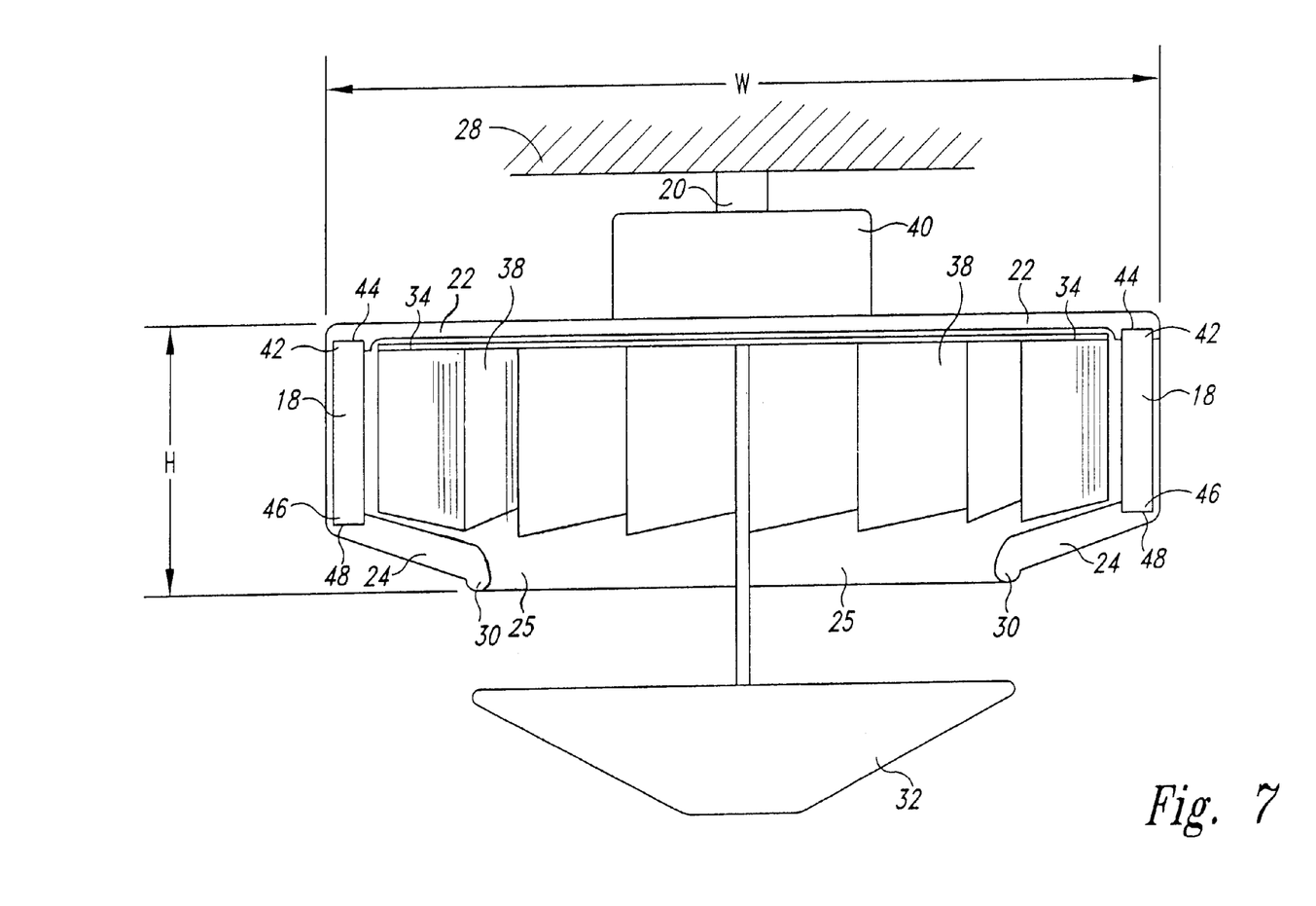
FIG. 7 is a cross-sectional elevation of the second embodiment of the inventive filtration device shown in FIGS. 6A and 6B, including an optional decorative accessory.

FIG. 7 shows the details of the device 60. In the device 60, the motor 40 is outside the housing 12 and attached to the upper part 22 thereof. The device 60 has an overall width W between about 6 inches and about 36 inches and an overall height H between about 5 inches and about 17 inches; it thus has a greater height H than the device 10 and a higher profile. Because the hub 36 need only accommodate a shaft and not the entire motor, it can be made smaller than the hub that would be used in the device 10.

Two embodiments of the present invention have been described above. A person skilled in the art, however, will recognize that many other embodiments are possible within the scope of the claimed invention. For this reason, the scope of the invention is not to be determined from the description of the embodiments, but must instead be determined solely from the claims that follow.

What is claimed is:

1. An air filtration device comprising:
   a housing comprising a non-air communicating upper surface part and a lower part, wherein the upper and lower parts are parallel and spaced apart from each other and define a cavity therebetween, wherein the lower part has a centrally positioned opening therein, and, wherein the upper part of the housing is suspended from, or flush mounted to a supporting surface;
   a rotary motor having a rotating shaft which defines an axis of rotation, wherein the motor is positioned such that the axis of rotation is co-linear with an axis of the housing;
   an impeller positioned in the cavity coaxially with the axis of the motor and attached to the motor, said impeller having a plurality of blades that curve away from the direction of rotation;
   a filter positioned between the upper and lower parts and positioned around a perimeter of the cavity; and
   a lighting fixture attached to the lower part of the housing, said fixture providing for positioning of a light emitting element therein, and directing unfiltered airflow away from, and not towards and over the light emitting element.

2. The air filtration device of claim 1 further comprising a plurality of vanes positioned around a perimeter of the housing between the upper and lower parts, whereby the vanes are set at an angle with respect to a plane parallel to the supporting surface to direct a flow of air in a direction away from the plane.

3. The air filtration device of claim 1 wherein the housing is axisymmetric.

4. The air filtration device of claim 3 wherein the housing is round.

5. The air filtration device of claim 1 wherein the lower part has a bell-mouth surrounding the opening.

6. The air filtration device of claim 1 wherein the top and bottom parts have a finish thereon selected from among a group consisting of paint, enamel, and textured resin.

7. The air filtration device of claim 1 wherein the motor is outside the housing and attached to the upper part thereof.

8. The air filtration device of claim 1 wherein the motor is in the cavity and positioned in a hub portion of the impeller.

9. The air filtration device of claim 1 wherein the impeller has an axis and the plurality of blades extend radially from the axis.

10. The air filtration device of claim 1 wherein the impeller has a diameter between about 10 percent and about 95 percent of a width of the housing.

11. The air filtration device of claim 1 wherein the filter is a mechanical filter.

12. The air filtration device of claim 11 wherein the filter is a high-efficiency particulate air (HEPA) filter.

13. The air filtration device of claim 1 wherein the filter is an electrical filter.

14. The air filtration device of claim 13 wherein the filter is an electrical attraction filter.

15. The air filtration device of claim 1 wherein the filter comprises a strip of filtration whose ends fasten together to keep it attached to the housing.

16. The air filtration device of claim 15 wherein the ends of the filter are attached to each other using means selected from a group consisting of VELCRO®, metal hooks, and adhesive strips.

17. The air filtration device of claim 1 wherein the supporting surface is a ceiling, or a recession thereof.

18. The air filtration device of claim 1 further comprising a decorative accessory attached to the device.

19. The air filtration device of claim 18 wherein the decorative accessory is the lighting fixture.

20. An air filtration device attachable to a rotary motor, the device comprising:
    a housing comprising a non-air communicating upper surface part and a lower part, wherein the upper and lower parts are parallel and spaced apart from each other and define a cavity therebetween, wherein the lower part has a centrally positioned opening therein, and wherein the upper part of the housing is suspended from, or flush mounted to a supporting surface;
    an impeller positioned in the cavity coaxially with an axis of the motor and attached to the motor, said impeller having a plurality of blades that curve away from the direction of rotation;
    a filter positioned between the upper and lower parts and positioned around a perimeter of the cavity; and
    a lighting fixture attached to the lower part of the housing, said fixture providing for positing of a light emitting element therein, and directing unfiltered airflow away from, and not towards and over the light emitting element.

21. The air filtration device of claim 20 wherein the motor is a rotary motor having a rotating shaft which defines an axis of rotation, wherein the motor is positioned such that the axis of rotation is co-linear with an axis of the housing.

22. The air filtration device of claim 20 further comprising a plurality of vanes positioned around a perimeter of the housing between the upper and lower parts, whereby the vanes are set at an angle with respect to a plane parallel to the supporting surface to direct a flow of air in a direction away from the plane.

23. The air filtration device of claim 20 wherein the housing is axisymmetric.

24. The air filtration device of claim 23 wherein the housing is round.

25. The air filtration device of claim 20 wherein the lower part has a bell-mouth surrounding the opening.

26. The air filtration device of claim 20 wherein the top and bottom parts have a finish thereon selected from among a group consisting of paint, enamel, and textured resin.

27. The air filtration device of claim 20 wherein the motor is outside the housing and attached to the upper part thereof.

28. The air filtration device of claim 20 wherein the motor is in the cavity and positioned in a hub portion of the impeller.

29. The air filtration device of claim 20 wherein the impeller has an axis and the plurality of blades extend radially from the axis.

30. The air filtration device of claim 20 wherein the impeller has a diameter between about 10 percent and about 95 percent of a width of the housing.

31. The air filtration device of claim 20 wherein the filter is a mechanical filter.

32. The air filtration device of claim 31 wherein the filter is a high-efficiency particulate air (HEPA) filter.

33. The air filtration device of claim 20 wherein the filter is an electrical filter.

34. The air filtration device of claim 33 wherein the filter is an electrical attraction filter.

35. The air filtration device of claim 20 wherein the filter comprises a strip of filtration whose ends fasten together to keep it attached to the housing.

36. The air filtration device of claim 35 wherein the ends of the filter are attached to each other using means selected from a group consisting of VELCRO®, metal hooks, and adhesive strips.

37. The air filtration device of claim 20 wherein the supporting surface is a ceiling, or a recession thereof.

38. The air filtration device of claim 20 further comprising a decorative accessory attached to the device.

39. The air filtration device of claim 38 wherein the decorative accessory is the lighting fixture.

* * * * *